Patented Aug. 11, 1931

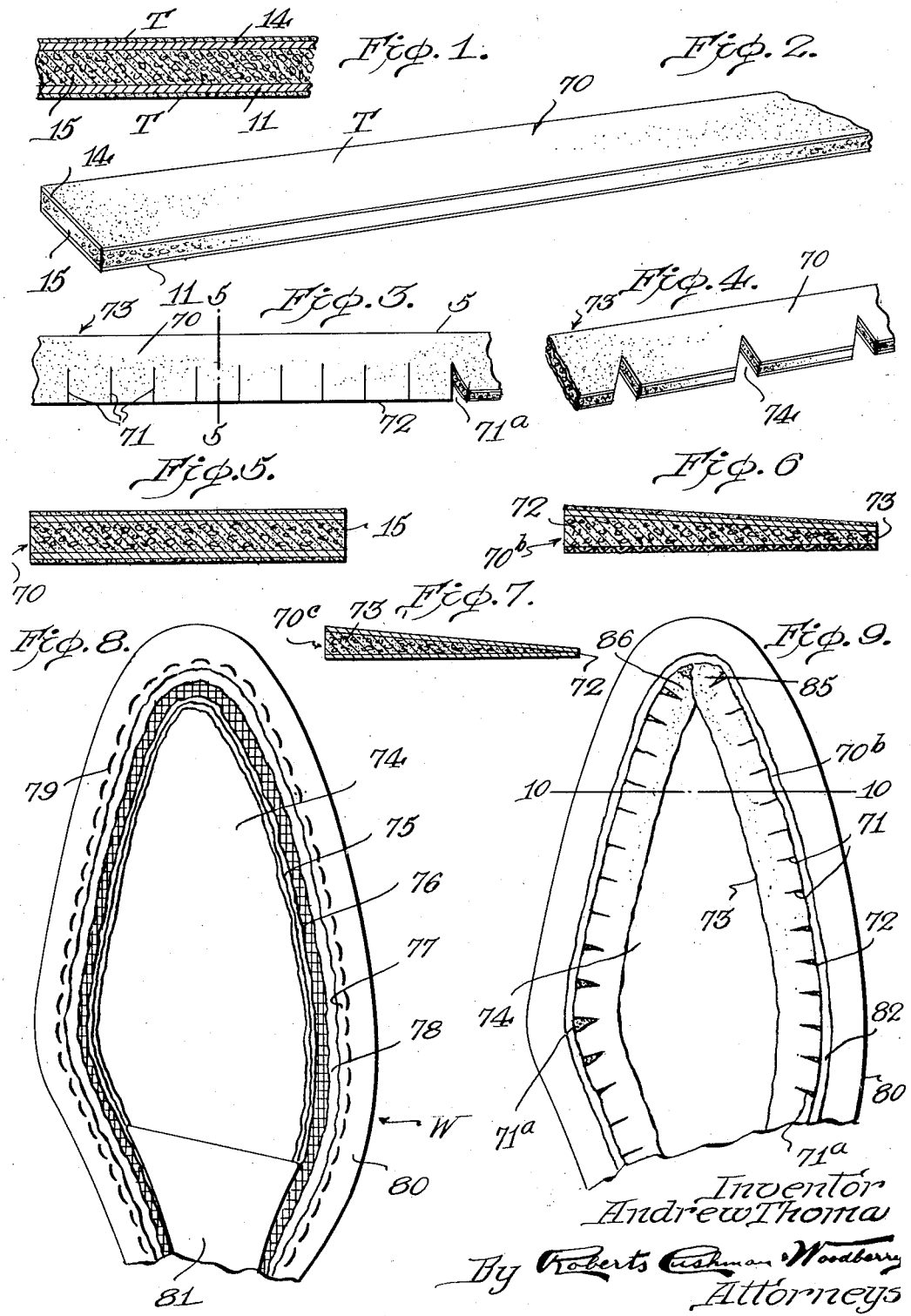

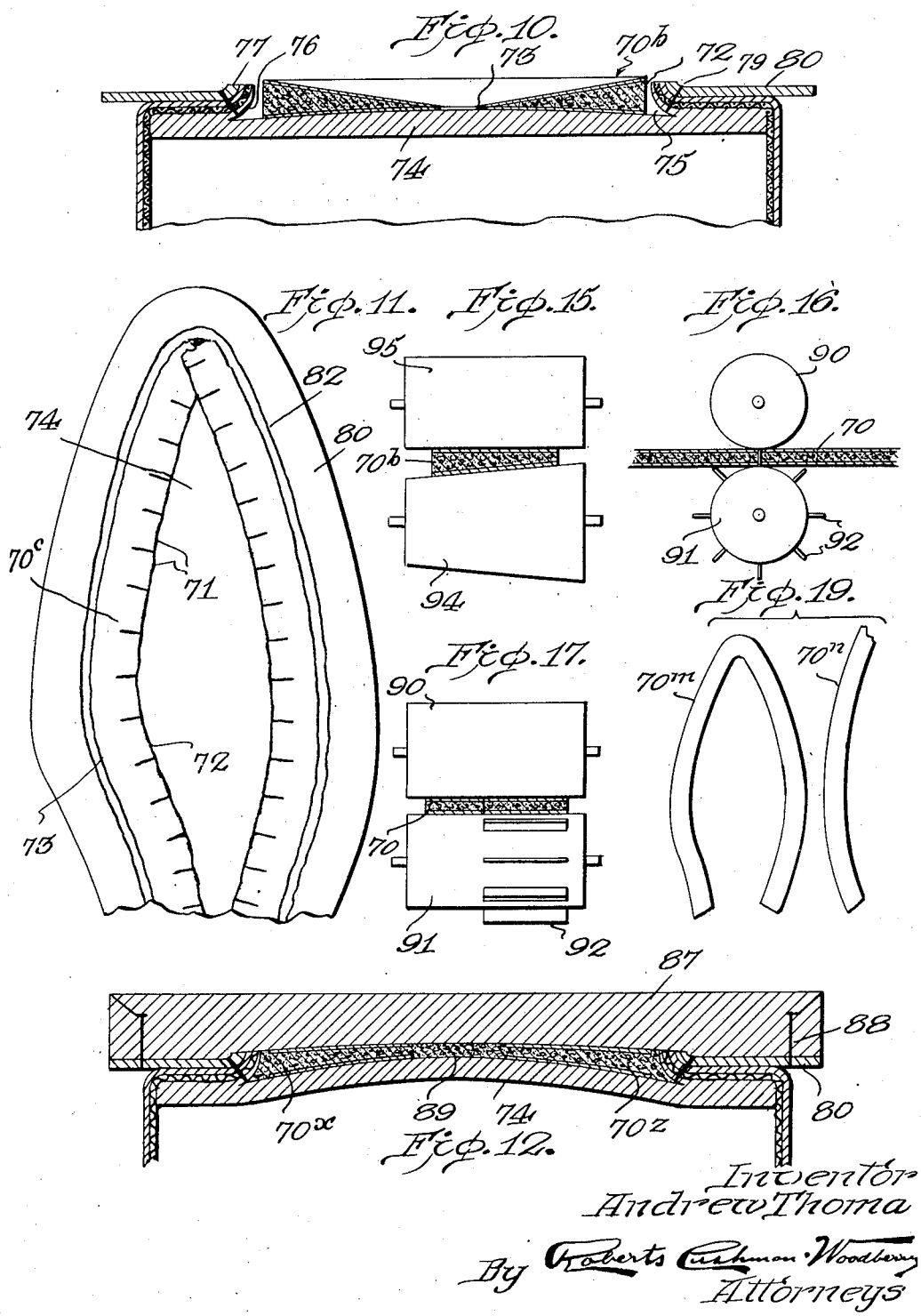

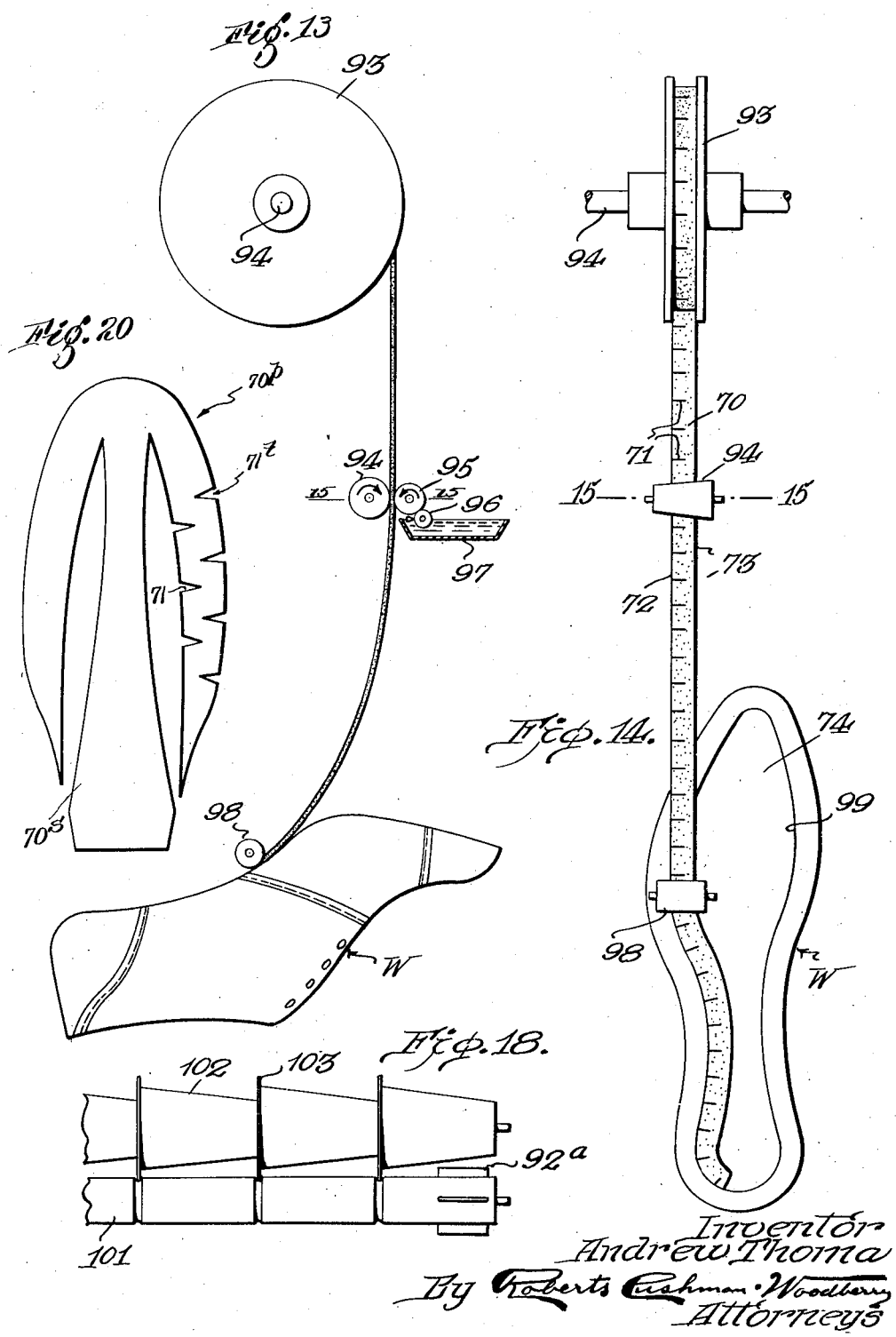

1,818,827

UNITED STATES PATENT OFFICE

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS

MEANS FOR FILLING SHOE-BOTTOM CAVITIES

Application filed August 10, 1927. Serial No. 212,018.

This invention pertains to the manufacture of shoes and more particularly to means for and a method of filling shoe-bottom cavities the method, however, not being claimed in this application. In my copending application Serial No. 183,302, filed April 13, 1927, I have described a novel shoe filler material in sheet form comprising a layer of sticky, plastic and waterproof filler compound protected and reinforced in such a manner, for example by interposing it between paper-like skins, as to make it self-sustaining, coherent and capable of being handled substantially like ordinary sheet materials. In my application Serial No. 192,076, filed May 17, 1927, I have more fully described the preparation of a leaf-like shoe filler package from such sheet filler material, and in my application Serial No. 210,558, filed August 4, 1927, I have described a desirable mode of procedure in filling shoes by means of such filler leaves.

In accordance with the disclosure of the two last-named applications I employ a filler leaf placed centrally of the shoe bottom and, after attaching the outer sole, subject the shoe to a leveling process which causes the filler leaf to spread laterally so that the plastic filler layer fills all interstices and recesses of the shoe bottom. This is a highly desirable mode of procedure, particularly in dealing with shoes of the McKay type where the cavity is shallow and does not vary greatly in depth at different parts, although the above mode of applying filler material is also useful in filling welt shoes. However, since the cavity of a welt shoe is relatively deep as compared with that of a McKay and particularly by reason of the fact that the cavity in the welt shoe is much deeper adjacent to the inseam and at the toe than at the center of the shoe bottom, it is evident that the application of a filler leaf of uniform thickness to the center of a welt shoe bottom necessitates very substantial distortion of the leaf and displacement of its constituent materials in order properly to fill the deep marginal portions of the cavity.

In accordance with the present invention I avoid the necessity of applying prolonged and heavy leveling pressure to flow a filler leaf outwardly toward such deep marginal portions of the cavity since I preferably substitute for the filler leaf of my prior applications an elongate strip of filler which is laid in the deepest part of the cavity following the contour of the inseam and when the shoe thus filled is leveled, the bulk of the filler material is not greatly distorted and just sufficient of the material flows inwardly to fill the relatively shallow middle part of the cavity. In its broader aspects my present invention includes the application of a relatively narrow strip of filler material to the shoe-bottom cavity in any desired manner preferably marginally and without reference to the specific physical characteristics or composition of the filler material composing the strip but in its preferred form I prepare this filler strip from sheeted filler material, such for example as disclosed in my copending application Serial No. 183,302, above referred to, and spread the same cold preferably by pressure, but not to exclude other methods, as by the old hot roll.

This filler strip, prepared from my sheeted material and in its preferred embodiment, is of ribbon-like form and usually of uniform width, the width being varied in accordance with the style and size of shoe to which it is to be applied. Preferably this strip is scored or slashed along one edge (either its inner or outer edge as referred to the shoe) to permit it to follow the curved contour of the cavity. Where the cavity is deepest (i. e. at the toe) the overlapping of the filler strip, as it makes the sharp bend at the toe provides the additional filler material for filling this tip portion of the cavity.

If desired the strip is beveled (wedge-shaped or triangular in section) so as to dispose the greatest thickness of filler material close to the inseam where the cavity is of maximum depth, and preferably the strip is secured in position by means of suitable adhesive which may be applied by hand or by suitable mechanism just prior to application of the strip to the shoe. Obviously, in a manner analogous to that set forth in my copending application Serial No. 183,302, the adhesive surface for attaching the strip to the shoe bottom may be provided by tearing off or otherwise removing the protective skin from one side of the strip, thus leaving the adhesive layer exposed for direct application to the shoe bottom.

Sheet filler material of the general type disclosed in my application Serial No. 183,302 is readily made in various thicknesses and in making my present filler strip I select such a thickness of material as is best adapted to meet the particular requirements of the shoe in which the strip is to be used. Thus, when a "Gem" inner sole is used it may be desirable to employ a thicker strip than with other types of inner soles. Moreover, when the inner sole is noticeably convex or crowning, as in a leather welt inner sole, I prefer to employ a strip of wedge-shaped section, as above referred to.

The filler strip may be supplied in lengths just sufficient for filling a single shoe or in longer lengths from which sufficient material may be severed as used. I preferably lay the strip progressively along the margin of the cavity beginning, for example, at the heel and following the edge of the cavity along one side, around the toe and then back toward the heel along the other side of the cavity, although other modes of laying the filler strip fall within the scope of the present invention. The strip may extend around the entire margin of the cavity as suggested or along such fractional portion thereof as may be desired. I also contemplate that generally equivalent results may be obtained (although probably with less economy of material) by cutting out substantially U-shaped pieces of the sheeted filler and applying such pieces to the marginal portion of the cavity and such pieces are to be considered as falling within the term "filler strip" as here employed.

While I may apply the filler strip to the shoe wholly by hand I prefer to provide certain instrumentalities to assist in the application of the strip to the shoe. Thus I preferably provide the filler in the form of a coil, mounting this coil of filler strip upon a reel or other suitable support, and draw off the strip from the reel and pass it in contact with a roll or other device for applying adhesive to one side of the strip. If the strip is of the spreadable type, it is now pressed into contact with the surface of the inner sole of the shoe by means of a suitable roller or other guiding and compressing element adapted to lay the filler strip smoothly against the surface of the shot bottom as the shoe is moved relatively to the roller. The shoe and roller may be given the proper relative motion by mechanical means, although ordinarily I find that the operator may hold the shoe in his hands and guide it beneath the roller without difficulty.

In the accompanying drawings I have illustrated my novel form of shoe filler, together with certain steps in the process of making and applying it, with the understanding that these illustrations are by way of example only and are not intended to restrict or define the invention.

In the drawings:

Fig. 1 is a fragmentary vertical section, to large scale, illustrating a preferred form of my sheeted filler material;

Fig. 2 is a perspective view showing the appearance of a strip cut from such sheeted filler material;

Fig. 3 is a plan view, partly in perspective, showing a strip such as that of Fig. 2, but provided with slashes or incisions along one edge;

Fig. 4 is a perspective view showing a modified form of strip in which the slashes are shown as notches;

Fig. 5 is a transverse vertical section on line 5—5 of Fig. 3 showing a strip of uniform thickness from side to side;

Fig. 6 is a section similar to Fig. 5, but showing a strip of a wedge-shape section, truncated at its inner end;

Fig. 7 is a similar view but showing a strip of triangular transverse section;

Fig. 8 is a plan view illustrating the appearance of the bottom of a welt shoe prior to filling;

Fig. 9 is a diagrammatic plan view showing a welt shoe bottom after the application of my improved filler strip thereto;

Fig. 10 is a section on the line 10—10 of Fig. 9;

Fig. 11 is a view similar to Fig. 9 but illustrating a modified arrangement of the filler strip in the cavity;

Fig. 12 is a transverse section, to large scale, showing a welt shoe with its outer sole in position and indicating the appearance of the filler material after the leveling operation;

Fig. 13 is a diagrammatic side elevation illustrating a preferred mode of applying my filler strip to the shoe;

Fig. 14 is a front elevation of the parts shown in Fig. 13;

Fig. 15 is a horizontal section substantially on the line 15—15 of Fig. 13;

Fig. 16 is an end elevation of apparatus useful in forming the slits or slashes in the edge of the filler strip;

Fig. 17 is a front elevation of the apparatus shown in Fig. 16;

Fig. 18 is a front elevation of modified apparatus useful in cutting sheeted material for producing my improved filler strip;

Fig. 19 is a diagrammatic view illustrating modified forms of my filler strip; and Fig. 20 is a diagrammatic or plan view of a further modification, showing a piece of punched-out, multi-prong or finger-like shape.

It will be understood that the drawings are largely diagrammatic in form, with no attempt to conform accurately to the working details, shape and proportions of a shoe.

Referring to Fig. 1, the sheet material which I prefer to employ in making my filler strip consists of a layer 15 of permanently sticky, plastic shoe filler compound which may be of any of the kinds disclosed in my prior patents, for example Patent No. 855,868, dated June 4, 1907, and which are typically characterized by the presence of a semi-fluid binder, such for example as the sticky residuum of petroleum known as "wax tailings" intermingled with a comminuted solid, such for example as ground cork. This sticky layer, as fully disclosed in my application Serial No. 183,302, is protected and reinforced so that the composite sheet becomes self-sustaining, shape-retaining and coherent by interposing the layer 15 between outer skins 11 and 14. These skins may be of any suitable material having the desired characteristics, although I prefer to employ paper-like webs for enclosing and protecting the layer 15. Preferably the outer surfaces of the webs or skins 11 and 14 are dusted or coated as indicated at T with a non-adhesive and preferably slippery substance, for example, as powdered talc, soapstone or the like.

The sheeted material thus produced is coherent, and may be handled in substantially the same way as ordinary sheet materials, but when incorporated in a shoe bottom it is capable of flowing or spreading at normal temperature when subjected to shoe-leveling pressure, all as more fully described in my copending applications, above referred to.

In accordance with my present invention I take this sheeted material and cut it up by suitable means into elongate and relatively narrow strips 70 (Fig. 2). Each of these strips possesses the peculiar characteristics of the original sheet material, being self-sustaining and coherent, and yet plastic when subjected to pressure so that it can spread in any direction. This strip filler may be made of any desired length and I contemplate that it may be prepared as the final step in the process of making the sheeted material, that is to say, that the sheeted material may be divided into these narrow strips as it is delivered from the sheeting apparatus. As thus prepared the strip 70 is of substantially uniform thickness from edge to edge, as indicated in Fig. 5, and such a strip may be employed without further preparation if desired in filling the shoe-bottom cavity.

However, I prefer, in order that the strip may be more flexible or pliable, to form a series of slashes or incisions 71 extending inwardly from one edge 72 of the strip (see Fig. 3). These slashes 71 may extend inwardly as far as desired but do not extend entirely across the strip, the edge 73 being continuous and entire. By thus slashing one edge of the strip, it is possible to bend the strip quite sharply edgewise in its own plane since the incisions or slashes will open up readily as shown at 71ª (Fig. 3), permitting a very substantial elongation of the edge 72 relatively to the edge 73. This is of assistance in laying the strip along the curved margin of the shoe-bottom cavity.

While the slashes or incisions 71 are usually sufficient, I contemplate that I may provide notches 74, as shown in Fig. 4, in place of the plain incisions. When notches are thus provided the strip may be bent edgewise with the notched edge at the inner side of the curve as well as in the other direction.

While, as above stated, the plain strip, as shown in Fig. 2, may be used, and while a strip of uniform thickness but having slashes, as shown in Fig. 3, may also be employed, I prefer to subject the strip to a further process before applying it to the shoe. The result of this further process is illustrated in Figs. 6 and 7. In Fig. 6 the strip 70ᵇ has been compressed at its edge 73 so as to make it thinner than at its opposite edge, while in Fig. 7 the strip 70ᶜ has been compressed at its edge 72, leaving its edge 73 of full thickness. In thus compressing the strip to make one edge thinner than the other, I find that the material tends to flow so that the thicker edge of the strip may ultimately have a thickness greater than that of the original strip.

Referring to Fig. 8, I show the appearance of the bottom of a welt shoe of usual construction before filling and prior to application of the outer sole. This shoe W has the inner sole 74 provided with the marginal channel 75 forming the attaching lip 76. The inner edge 77 of the welt strip and the edge portion 78 of the combined lining and outer element of the upper are secured to the lip 76 by means of the inseam stitches 79. The outer portion of the welt is indicated at 80 and a shank piece 81. The channel lip 76 defines the margin of the shoe-bottom cavity, and the free edge of this lip, usually formed as two lips constituting the stitch-rib, together with the edge portions of the lining, upper and welt are commonly referred to as the "between substance".

Referring to Figs. 9 and 10, I have indicated diagramamtically the appearance of the shoe bottom after the application of my improved filler strip. In these views the inner sole is indicated at 74, the outer portion of the welt at 80 and the between substance at 82. The filler strip 70ᵇ is laid along the margin of the shoe-bottom cavity against the inner edge of the between substance 82, with the slashed edge 72 of the strip against the between substance.

In passing around the sharper curvatures of the margin of the cavity, the slashes in the edge of the filler strip may open as indicated at 71ᵃ, but in laying the filler strip around the toe portion of the cavity the curvature is so sharp that a portion 85 of the filler strip overlaps another portion 86, thus providing an abnormal amount of the filler material at this point. Since the toe portion of the cavity is deeper than any other part, this abnormal amount of filler material thus provided is advantageous and facilitates the production of a level surface for engagement with the outer sole. As shown in this view, the slashed edge 72 of the filler strip 70ᵇ is outermost, the unslashed edge 73 being directed toward the central part of the cavity, and if the filler strip 70ᵇ is wedge-shape in section, as shown in Fig. 6, the thicker edge 72 which is also the slashed edge, is disposed at the deeper part of the cavity.

In Fig. 11 I have shown a different mode of applying the strip, using the filler strip 70ᶜ of Fig. 7 in which the slashed and thinner edge 72 is arranged at the inside and the unslashed thicker edge 73 engages the between substance. As thus arranged, the slashes permit portions of the edge of the strip to ride up one on another, thus permitting the strip to follow the curved contour of the cavity. If a strip having notches, such as 74, be used and arranged as shown in Fig. 11, the bending of the pliable strip closes the notches 74 so that the strip may lie smooth against the surface of the inner sole.

After the strip has been laid in the shoe-bottom cavity, the outer sole 87 (Fig. 12) is attached in usual manner by means of stiches 88 to the outer part of the welt 80. The sole is now subjected to leveling pressure and the opposite portions 70ˣ and 76ˣ of the filler strip which lie in the deep marginal portions of the cavity are compressed and spread. In doing so the plastic filler layer flows toward the center of the cavity and the filler material from the oppositely positioned strips meets at 89, thus completely filling the cavity, but since the major part of the filler material is originally disposed at the deepest parts of the cavity there is comparatively little movement of the material, so that the usual leveling pressure employed in the manufacture of welt shoes is sufficient for the purpose.

In Figs. 16 and 17 I have illustrated apparatus for forming the slits or slashes in the edge of the strip of material. Thus, I may employ a pair of rollers 90 and 91, one of such rollers being provided with radial blades 92, these rollers being driven in any suitable manner so as to feed the strip 70 between them. As the strip passes between the rolls the blades 92 pass through the strip, forming the desired slashes or incisions, the length of the blades 92 being so chosen as to provide slits or slashes of desired depth.

The slashed strip, after passing through the apparatus of Figs. 16 and 17, is now preferably wound to form a coil and this coil may be mounted upon a reel or drum 93 carried by a shaft 94. From this reel the material is pulled off and passed between rollers 94 and 95. One of these rollers, for example the roller 95, is supplied with suitable adhesive, as by contact with a roller 96 partially immersed in a body of adhesive in a receptacle 97. If it be desired to compress the strip so as to make one edge thicker than the other, this may be readily accomplished at this point in the operation by making the roller 94 conical, as shown in Fig. 15. Whether or not the strip is thus compressed, it now passes down beneath an applicator roll 98. This applicator roll may be carried in any suitable support and if desired may be caused to be rotated continuously by power. This roll 98 is so arranged that the operator may present the bottom of a shoe to the roll in proper position to permit the roll to press the strip of filler material against the inner sole of the shoe. Thus, as shown in Fig. 14, the extreme end of the strip has been attached to the inner sole 74 of the shoe W (at the extreme rear end of the shoe cavity). Preferably the end of the strip is attached to the sole by means of its adhesive surface as provided by the roll 95. The shoe is now moved relatively to the roll 98 so as to cause the roll to press the strip against the inner sole and to cause the strip progressively to engage the inner sole and to follow the contour of the cavity. The shoe is moved in this manner until the toe is reached, whereupon the shoe is turned through nearly 180°, causing the strip to overlap at the toe portion of the cavity and then the operation is continued, laying the strip progressively along the opposite edge of the cavity until the heel is reached. It is obvious that if only the forepart of the cavity is to be filled, the end of the strip may first be applied at or about the shank and then progressively laid along the edge of the cavity as above described. While I prefer to apply adhesive to one side of the strip before placing the strip in the shoe bottom, I may, if preferred, strip off from one side of the strip the protective coating or skin, and to facilitate this operation I may pass the strip over a heated surface which loosens the connection between the protective skin and the layer of plastic filler material and at the same time increases the stickiness of the binder so that when the exposed surface of the strip is brought into contact with the shoe bottom, the strip firmly adheres thereto without the use of other adhesive. Similarly the roll 98, for instance, may be heated to facilitate the rapid laying of the strip, or any other kind of pretreatment or tempering may be used. The strip may be tempered by immersion or subjection to vapor, hot or cold, other tempering agencies such as water, volatile fluids or the like, as disclosed in my application Serial No. 210,558 and in the copending application Serial No. 212,352, of A. H. Avery, filed August 11, 1927. Also, especially when one of the cover strips is omitted, a latent adhesive, such as starch or any of those mentioned in the applications noted herein may be embodied in the article. Other means and structures may be employed, as already disclosed and claimed in the other copending applications.

While the mechanism just described is useful in applying the adhesive and in laying the strip against the bottom of the shoe, it is obvious that the entire operation might be carried out by hand if preferred.

In Fig. 18 I have illustrated mechanism for cutting up the sheet material into strips and at the same time compressing these strips to make them thicker at one edge than at the other. This apparatus comprises a cylindrical roll 101 and a second roll 102 having a series of conical portions with cutter blades 103 interposed between the small end of one portion and the large end of the next. Further, if desired, the cylindrical roll 101 may be provided with knife blades 92ª adapted to form the slits or incisions at one edge of the strip. By passing the sheet material through this apparatus it may be reduced to the final form for application to the shoe bottom without further treatment other than to provide the adhesive surface.

While I prefer to employ the material in the form of straight strips, such as shown in Fig. 2, I contemplate that the material may be cut up into pieces of substantially U-shape, as shown at 70ᵐ in Fig. 19 or in curved sections 70ⁿ, Fig. 19, of less extent or in various other strip-like forms, such for example as the punched out piece 70ᵖ, Fig. 20, where a tongue 70ˢ extends centrally of the U-shaped part which corresponds to 70ᵐ of Fig. 19 and may have notches 71 and 71ᵗ. This is one example of a multi-tongue or finger-like shape. Such curved or punched out pieces are laid in the cavity of a shoe bottom the same as before against the edge of the cavity or stitch rib, requiring little bending and fitting, thus filling the deep portions of the cavity, but though this mode of filling is within the broad scope of my invention, I prefer to employ the straight strip filler since it involves less waste of material in its preparation. In the case of the punched-out or died-out shape shown in Fig. 20 the spreading under pressure takes place in both directions, inwardly toward the center and outwardly from the center. The peculiar shape, Fig. 20, is to provide just the required proportion of spreadable capacity and of predetermined cover filling capacity for the general shape of McKay bottoms and varying or unequal in the different parts of the cavity. This will be varied to suit the requirements of welt bottoms, special bottoms or other special styles or makes of shoes. Further advantage resides in requiring less pressure.

While I have hereinabove described certain steps as constituting my process, I wish it to be understood that I do not limit myself to these particular steps or to the precise order in which they have been described, but that other steps may be substituted for some of those here mentioned and that the order of steps may be varied as circumstances may require. Furthermore, while I have illustrated apparatus useful in preparing my improved strip and in applying it to a shoe bottom, I wish it to be understood that a wide variety of apparatus, method, and article embodiments come within the spirit and scope of my invention.

I claim:

1. A shoe-filler piece adapted for filling a shoe bottom cavity comprising spreadable filler material of the kind containing comminuted solids mixed with a sticky binder, made in the form of a plastic strip as distinct from a sheet-like piece, having a width adapted when the strip is placed along the margin of the shoe bottom cavity to cover less than the area of the shoe bottom cavity.

2. A spreadable shoe-filler piece adapted for filling a shoe bottom cavity comprising spreadable filler material of the kind containing comminuted solids mixed with a sticky binder, made in the form of a plastic strip as distinct from a sheet-like piece, having a width adapted when the strip is placed along the margin of the shoe bottom cavity to cover less than the area of the shoe bottom cavity, and having capacity to spread laterally thinner in one direction and thicker in another direction.

3. A shoe-filler piece comprising spreadable filler material of the kind containing comminuted solids mixed with a sticky binder in the form of a strip, as distinct from a sheet-like piece, at least part of which is spreadable, having a width adapted when the strip is placed along the margin of the shoe bottom cavity to cover less than the area of the shoe bottom cavity, and shaped and constructed to spread at different places in different directions in response to leveling pressure.

4. A shoe-filler piece adapted for filling a shoe bottom cavity comprising spreadable filler material of the kind containing comminuted solids mixed with a sticky binder, made in the form of a strip, as distinct from a sheet-like piece, having a width adapted when the strip is placed along the margin of the shoe bottom cavity to cover less than the area of the shoe bottom cavity, and having a spreadable area, movable inward, when in the shoe bottom, toward the center of the shoe bottom under vertical pressure.

5. A shoe-filler piece adapted for filling a shoe bottom cavity comprising spreadable filler material of the kind containing comminuted solids mixed with a sticky binder made in the form of a strip, as distinct from a sheet-like piece, having a width adapted when the strip is placed along the margin of the shoe bottom cavity to cover less than the area of the shoe bottom cavity, and having a spreadable area, one portion of which is movable inwardly toward the center of the shoe bottom and another portion of which is movable in a different direction, when in the shoe-bottom cavity and subjected to pressure.

6. A ribbon-like shoe-filler strip, comprising a layer of flexible, sticky, waterproof material and a supporting web secured permanently together, said strip being normally firm and stable but capable of conforming to the requirements of a shoe-bottom cavity.

7. A ribbon-like shoe-filler strip capable of spreading at normal temperature when subjected to shoe-leveling pressure, said strip having slippery outer surfaces and being sufficiently pliant to permit it to bend in laying it in a shoe-bottom cavity.

8. A ribbon-like shoe-filler strip capable of spreading at normal temperature when subjected to shoe-leveling pressure, said strip having normally dry and slippery outer surfaces and being adapted to be laid along the margin of a shoe-bottom cavity.

9. An elongate shoe-filler strip at least part of which is spreadable, having transverse incisions in one edge to facilitate bending, said strip being adapted to be laid in and conformed to a shoe-bottom cavity.

10. An elongate shoe-filler strip at least part of which is spreadable, of substantially uniform width having spaced notches in one edge to facilitate bending the strip in its own plane, said strip being adapted to be laid in and conformed to a shoe-bottom cavity.

11. A ribbon-like shoe-filler strip at least part of which is spreadable, thicker at one edge than at the other, the thicker edge being provided with spaced incisions to facilitate bending the strip, said strip being adapted to be laid in a shoe-bottom cavity with its thicker edge adjacent to and following the inner margin of the cavity.

12. A ribbon-like shoe filler strip comprising a layer of sticky plastic material interposed between protective skins, said strip being thicker at one edge than the other.

13. A shoe filler piece having a width adapted when the strip is placed along the margin of the shoe bottom cavity to cover less than the area of the shoe bottom cavity, in the form of a plastic strip having at least one supporting or protective skin or covering.

14. A spreadable shoe filler piece comprising spreadable filler material of the kind containing comminuted solids mixed with a sticky binder and having a width adapted when the strip is placed along the margin of the shoe bottom cavity to cover less than the area of the shoe bottom cavity, shaped and constructed to spread unevenly under leveling pressure.

15. An elongate plastic shoe filler strip adapted for filling a shoe bottom cavity comprising spreadable filler material of the kind containing comminuted solids mixed with a sticky binder, having a width adapted when the strip is placed along the margin of the shoe bottom cavity to cover less than the area of the shoe bottom cavity, adapted to be laid and spread along the marginal portion of a shoe bottom cavity.

16. An elongate plastic shoe filler strip adapted for filling a shoe bottom cavity comprising spreadable filler material of the kind containing comminuted solids mixed with a sticky binder, having a width adapted when the strip is placed along the margin of the shoe bottom cavity to cover less than the area of the shoe bottom cavity, of substantially uniform width and of sufficient flexibility to permit it to be laid in a shoe-bottom cavity following the curved marginal contour of said cavity.

17. A ribbon-like shoe filler strip adapted for filling a shoe bottom cavity comprising spreadable filler material of the kind containing comminuted solids mixed with a sticky binder, having a width adapted when the strip is placed along the margin of the shoe bottom cavity to cover less than the area of the shoe bottom cavity, said strip being flexible, moldable and coherent for shipping and handling.

18. An elongate shoe filler strip for extending along the marginal portion of the cavity of a shoe bottom, having a width adapted when the strip is placed along the margin of the shoe bottom cavity to cover less than the area of the shoe bottom cavity, said strip comprising spreadable filler material of the kind containing comminuted solids mixed with a sticky binder and being capable of limited shifting under leveling pressure to conform to irregularities of depth and contour of a shoe-bottom cavity.

19. A ribbon-like shoe filler strip adapted for filling a shoe bottom cavity comprising spreadable filler material of the kind containing comminuted solids mixed with a sticky binder, having a width adapted when the strip is placed along the margin of the shoe bottom cavity to cover less than the area of the shoe bottom cavity, adapted to retain its shape at normal temperature and capable of spreading under pressure.

20. A pliant ribbon-like shoe filler strip adapted for filling a shoe bottom cavity comprising spreadable filler material of the kind containing comminuted solids mixed with a sticky binder, having a width adapted when the strip is placed along the margin of the shoe bottom cavity to cover less than the area of the shoe bottom cavity, of self-sustaining form and coherent characteristic capable when laid along the margin of a shoe-bottom cavity of spreading when subjected to leveling pressure.

21. An elongate relatively narrow shoe filler strip adapted for filling a shoe bottom cavity comprising spreadable filler material of the kind containing comminuted solids mixed with a sticky binder, having a width adapted when the strip is placed along the margin of the shoe bottom cavity to cover less than the area of the shoe bottom cavity, leaving the central portion of the cavity empty, said strip being plastic and capable of spreading under leveling pressure to fill the central part of the cavity.

22. A ribbon-like shoe filler strip having a width adapted when the strip is placed along the margin of the shoe bottom cavity to cover less than the area of the shoe bottom cavity, comprising a layer of normally plastic, compressible, and adhesive filler material of the kind containing comminuted solids mixed with a sticky binder.

23. A ribbon-like shoe filler strip of laminated material which is flexible, waterproof, moldable, and coherent for shipping and handling, one lamina consisting of spreadable shoe filler material and another lamina constituting a reinforcement, said strip being adapted to lie in the marginal portion of a shoe-bottom cavity and follow the contour of said cavity and having a width to cover less than the area of the shoe bottom cavity.

24. An elongate shoe filler strip comprising a layer of normally plastic and adhesive shoe filler material and means at one side at least of said layer for reinforcing it, said strip being pliant and adapted to be laid in a shoe-bottom cavity following the margin of the cavity.

25. A ribbon-like shoe filler strip comprising thin outside skins and an intermediate layer of plastic shoe-bottom filler, said strip being adapted to conform to the marginal contour of a shoe-bottom cavity.

26. A ribbon-like shoe filler strip comprising thin outside skins and an intermediate layer of granular sticky shoe-bottom filler, said strip being pliant at normal temperature and capable of being bent to conform to the contour of a shoe-bottom cavity.

27. A ribbon-like shoe filler strip comprising thin protecting layers and an intermediate layer of sticky material, said strip being adapted to be laid in the marginal portion of a shoe-bottom cavity and being capable of being molded at normal temperature when subjected to pressure.

28. A ribbon-like shoe filler strip comprising relatively inextensible outer skins and an interposed layer of filler material capable of exuding from between said skins when subjected to shoe-leveling pressure, said strip being pliant at normal temperature and adapted to be laid along the margin of a shoe-bottom cavity.

29. A ribbon-like shoe filler strip comprising a layer of ground cork or equivalent comminuted material united by a waterproof, sticky, waxy binder, and enveloping webs of paper secured to opposite sides, respectively, of said layer, the strip being pliant and capable of being laid along the margin of a shoe-bottom cavity.

30. A ribbon-like shoe filler strip of multi-layer construction comprising at least one layer forming a reinforcing skin, another layer of moldable sticky bottom filler, and an outside slippery layer, said strip being adapted to be laid in the marginal portion of a shoe-bottom cavity following the contour of the cavity.

31. A ribbon-like shoe filler strip comprising a layer of plastic and sticky shoe filler material interposed between substantially non-adhesive outer skins, said strip having spaced incisions at one edge to facilitate bending it in its own plane.

32. A ribbon-like shoe filler strip comprising a layer of normally plastic shoe filler material interposed between reinforcing layers, said strip being of substantially wedge-shape in transverse section.

33. In combination with a shoe having a bottom cavity, a filler piece in the form of a plastic strip of spreadable filler material of the kind containing comminuted solids mixed with a sticky binder placed within the cavity along its margin, said strip normally having a width adapted to cover less than the area of the shoe bottom cavity.

34. A shoe filler piece comprising spreadable filler material of the kind containing comminuted solids mixed with a sticky binder and having a U-shaped formation approximating the contour of a shoe bottom cavity, the arms of the U-shaped piece having a width adapted when the piece is placed in the shoe bottom cavity with the arms of the U adjacent the margin of the cavity to cover less than the area of the shoe bottom cavity.

35. A shoe filler piece as defined in claim 34 further characterized by having an integral tongue extending into the space between the arms of the U.

Signed by me at Boston, Massachusetts, this 9th day of August, 1927.

ANDREW THOMA.